J. O. DODGE.
AIR BRAKE APPARATUS.
APPLICATION FILED FEB. 29, 1908.

911,953.

Patented Feb. 9, 1909.
4 SHEETS—SHEET 1.

Fig. 1.

Witnesses:—

Inventor:
James O. Dodge.
by
Attys.

J. O. DODGE.
AIR BRAKE APPARATUS.
APPLICATION FILED FEB. 29, 1908.

911,953.

Patented Feb. 9, 1909.
4 SHEETS—SHEET 2.

UNITED STATES PATENT OFFICE.

JAMES O. DODGE, OF LOS ANGELES, CALIFORNIA.

AIR-BRAKE APPARATUS.

No. 911,953.     Specification of Letters Patent.     Patented Feb. 9, 1909.

Application filed February 29, 1908. Serial No. 418,615.

*To all whom it may concern:*

Be it known that I, JAMES O. DODGE, a citizen of the United States, residing at Los Angeles, in the county of Los Angeles and State of California, have invented new and useful Air-Brake Apparatus, of which the following is a specification.

This invention relates to automatic air brake apparatus.

In a previous application of mine filed Oct. 22, 1907, Serial No. 398,663, is shown a construction wherein starting with a definite normal train pipe pressure, a definite reduction in the train pipe pressure will produce a definite and known brake cylinder pressure in each car, which will be uniform regardless of piston travel, and so long as the train pipe pressure is held constant, the pressure in the brake cylinders will also remain constant and any ordinary leakage will be automatically supplied from the auxiliary reservoirs, which in turn are kept fed up to the train pipe pressure regardless of the position of the brake and the auxiliary reservoir will always be charged to a pressure giving a safe margin for an automatic application in case of a broken train pipe.

The present invention retains all advantages of the former one referred to and has for its object to attain still further advantages one of which is to avoid waste of air which is likely to occur in brakes wherein different pressures are maintained on the opposite sides of valve operating pistons.

Another object is to avoid the danger common to other brakes, which in an emergency application may, and often do, fully release in a short time by reason of leakage of the triple valve piston into the open train pipe.

Another object is to overcome a disadvantage in other automatic brakes in which it is impossible to secure an emergency application after a moderately heavy service application has been made, and in which a number of successive cars on which the provision for local train pipe reduction is absent or inoperative, will often prevent emergency application behind such cars.

Another object is to provide a brake in which the emergency application is somewhat heavier than in brakes in common use, and is not at all dependent upon the auxiliary reservoir supply, which is often depleted at the time that an emergency stop is most needed.

With the present invention, during the full release of brakes all compartments of the valve operating apparatus are under equal pressure, thus nullifying the effects of interior leakage, and during service application of brakes all air leaking by the valve operating pistons passes to the brake cylinder, and is therefore not wasted as it partially or wholly compensates for brake cylinder leakage. Also, in this invention, a previous service application of the brakes does not prevent an emergency application, as any reduction of train pipe pressure, however slow, to a point having a known relation to the normal train pipe pressure will produce an emergency application considerably heavier than what could be obtained from the auxiliary reservoir alone, and when such application has resulted the chance for leakage is reduced to a minimum. It also follows that as the emergency application results from a slow heavy reduction as well as from a rapid reduction of train pipe pressure, such application will carry past any number of cars on which there is no local train pipe reduction.

Referring to the drawings: Fig. 15 is a section of the valve 61.

In Figs. 6 to 14 inclusive, those ports of the compound valve which are in register with each other and permit the passage of air may be determined graphically at a glance by the shading employed, for example; ports in the valve seat 51 are shaded by vertical lines, ports in the segment valves 52 and 56 are shaded by horizontal lines, and ports in the upper valve 57 are shaded by oblique lines.

Figure 1:
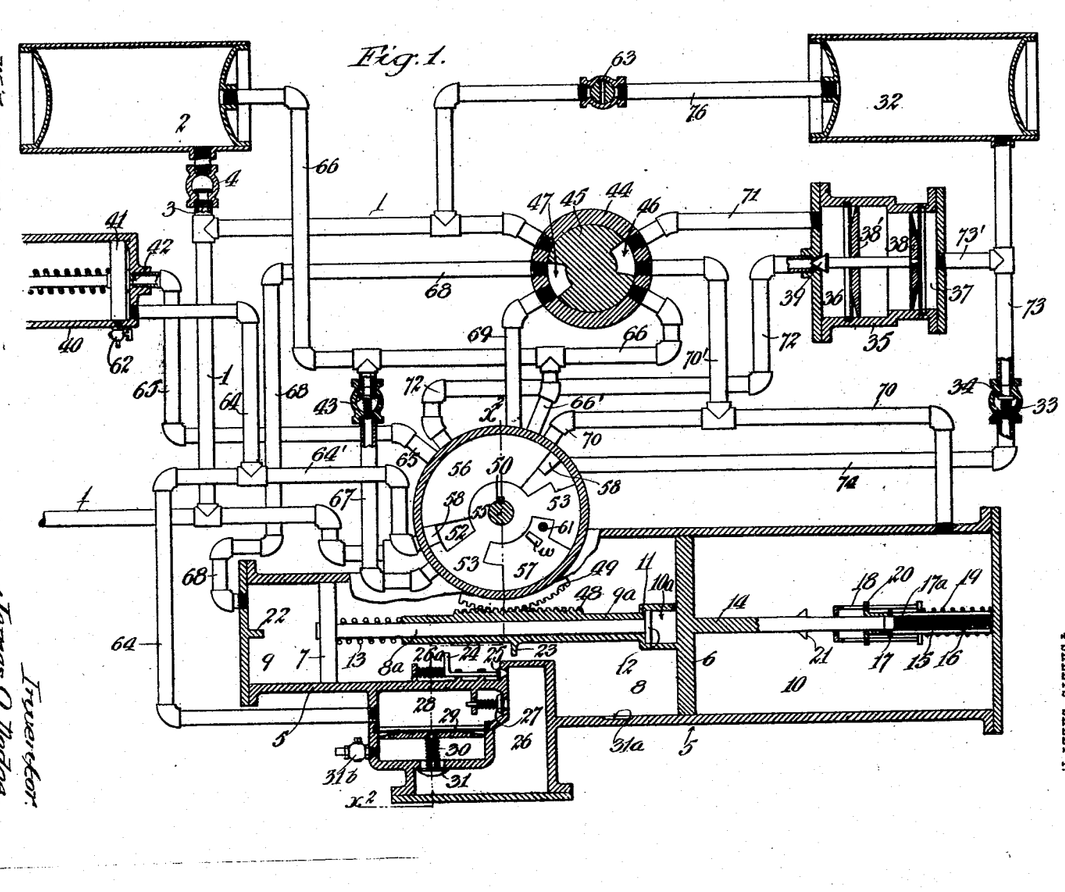
Figure 1 is a sectional view of the apparatus, the connecting pipes being in elevation, the parts being shown in running position.
Figure 2:
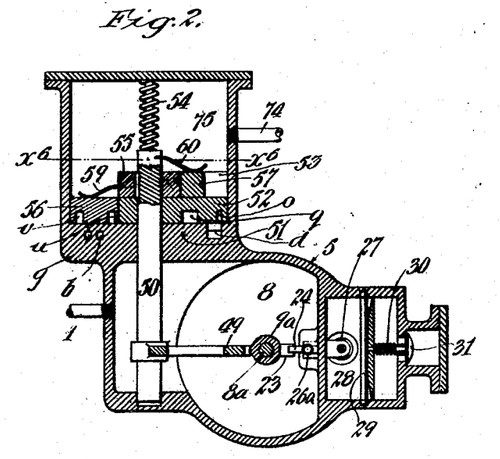
Fig. 2 is a sectional view on line $x^2$—$x^2$ of Fig. 1.

Referring particularly to Fig. 1 of the drawings; 1 designates the train pipe which is in permanent communication with auxiliary reservoir 2 through restricted passage 3, and a check valve 4 which permits flow of air into the auxiliary reservoir and prevents its discharge. 5 is a casing divided by pistons 6 and 7 into three chambers 8, 9 and 10, chamber 8 being in permanent communication with the train pipe, as will be described. $8^a$ is stem on piston 7 and moves longitudinally in a sleeve $9^a$ which latter comprises a stem on the piston 6. The sleeve $9^a$ has a recess $10^a$ with shoulder 11, which serves as a top for a flange 12 on stem $8^a$ to limit the outward movement of stem $8^a$ and sleeve $9^a$, which outward movement is produced by a spring 13. 14 is an extension of the stem of piston 6 and moves in a sleeve 15 which contains a spring 16 resisting movement of stem 14, the spring 16 being limited in its expansion by a pin 17 moving in slots $17^a$ in the sleeve 15. 18 is a sleeve outside of sleeve 15, and is pressed outwardly by a spring 19, and is limited in its outward movement by projections 20 on sleeve 15 which pass through slots in the sleeve 18. Springs 16 and 19 are expanded to their limits as shown in Fig. 1. Movement of stem 14 to the right is first resisted by spring 16 until shoulders 21 strike sleeve 18, after which it is opposed by both springs. 22 is a stop in chamber 9 limiting movement of piston 7 to the left. 23 is a shoulder on sleeve $9^a$ adapted to strike a projection 24 and open a valve 25, to admit air from chamber 8 to a chamber 26, where it may raise a check valve 27 and pass into a diaphragm chamber 28. $26^a$ is a spring tending to close valve 25 when pressure is removed from projection 24. 29 is a diaphragm exposed to air pressure in chamber 28 on one side which is opposed to a spring 30 and adapted to open valve 31 when the air pressure overcomes the spring pressure. $31^a$ is a small longitudinal groove in the interior wall of piston chamber 8. 32 is a supplemental reservoir. 33 is a check valve permitting free flow through pipe 73 from supplemental reservoir 32 and containing an orifice 34 which permits a restricted flow into the supplemental reservoir 32 when the check valve is seated. 35 is a diaphragm chamber divided into two compartments 36 and 37 by connected diaphragms 38 and 38' which may be separate diaphragms as shown, or may be one diaphragm with different areas exposed on the opposite sides. 39 is a valve operated by diaphragms 38 and 38' and adapted to open when the force exerted by pressure on the larger diaphragm 38' is greater than the opposing force exerted on the smaller diaphragm 38, and to close when the forces are equal or the pressure on diaphragm 38' is the less. 40 is the brake cylinder with its piston 41. 42 is a valve adapted to be closed by the pressure of piston 41 when the latter is in release position. 43 is a check valve permitting flow of air from the auxiliary reservoir 2 and preventing its return. 44 is a hand valve with revoluble plug 45 containing recesses 46 and 47. 48 is a rack carried by sleeve $9^a$ which rack engages a segmental gear 49, which, as shown in Fig. 2, is mounted on a shaft 50 which operates a compound valve arranged upon a seat 51. The shaft 50 is revoluble in the valve seat 51 and in a valve segment 52, the latter resting on valve seat 51. A pair of valve operating arms 53 are rigidly attached to a hub 55 secured to shaft 50 above the valve segment 52, and a coil spring 54 at the end of shaft 50 serves to hold the hub against valve segment 52 and keep the latter on seat 51. A small segment 56 is arranged in the same plane as the valve segment 52, occupying a portion of the space cut out of valve 52. These two valves, 52 and 56, move in the same plane and on the same seat, valve 56 being impelled in its movement by valve 52, the latter, however, being capable of a restricted movement before engaging the former. 57 is an upper valve, moving on the surface of valve 52 and fitting slidably between the arms 53 which cause it to turn in unison with shaft 50. Valve 52 is impelled in its movement by the arms 53 which coöperate with projections 58 on the valve 52 and the arms 53 may rotate a restricted distance before engaging the projections 58. It will now be seen that rotation of shaft 50 and arms 53 will turn valve 57 over the top of valve segment 52 until one or the other of arms 53 strikes a projection 58, whereupon both valves move in unison and when valve 52 strikes valve 56, all three valves are moved in unison by further rotation of shaft 50. 59 and 60 are springs tending to keep valves 57, 52 and 56 seated. 61 is a loose check valve, (shown in detail in section in Fig. 15) in valve 57 permitting free flow upward, and containing a small orifice permitting restricted flow downward when check valve is seated. 62 is a pet cock in brake cylinder 40 for releasing the brakes on an individual car. 63 is a stop cock in a pipe 76 which extends between the supplemental reservoir 32 and train pipe 1. 64 is a pipe leading from the brake cylinder 40 to the diaphragm chamber 28 and through branch 64' to ports d, d' of valve seat, the connection of said ports with pipe 64' being indicated by dotted lines Fig. 3. 65 is a pipe leading from valve 42 of brake cylinder 40 to port $f$ of valve seat. 66 is a pipe leading from auxiliary reservoir 2 to hand valve 44 and through branch 66' to ports $b'$, $b$ of valve seat. 67 is a pipe from pipe 66 through check valve 43 to port $c$ of valve seat. 68 is a pipe from chamber 9 to hand valve 44. 69 is a pipe from hand valve 44 to ports $g'$, $g$ of valve seat. 70 is a pipe leading from chamber 10 to port $h$ of valve seat and through branch 70' to hand valve 44. 71 is a pipe from hand valve 44 to compartment 36 of diaphragm chamber 35. 72 is a pipe from diaphragm valve 39 of compartment 36 to port $i$ of valve seat. 73 is a pipe leading from supplemental reservoir 32 through check valve 33 and pipe 74 to valve chamber 75 above rotary valves, and through branch 73' to compartment 37 of diaphragm chamber 35. 76 is a pipe from supplemental reservoir 32 through stop cock 63 to train pipe 1. Pipe 77 leads from port $e$ of the valve seat to the atmosphere, (see Fig. 3).

Figure 3:
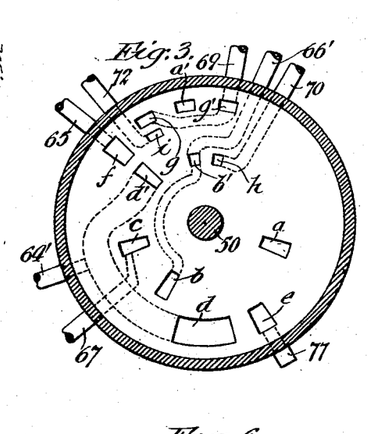
Fig. 3 is a face view of the rotary valve seat.

Referring to the compound valve, Figs. 2 and 3, ports $a$ and $a'$ pass through valve seat 51 to chamber 8 and train pipe 1. The other ports, $b$, $b'$, $c$, $d$, $d'$, $e$, $f$, $g$, $g'$, $h$, and $i$, have side passages and are connected with pipes as just described and as indicated in Fig. 1.

Figures 4, 5:
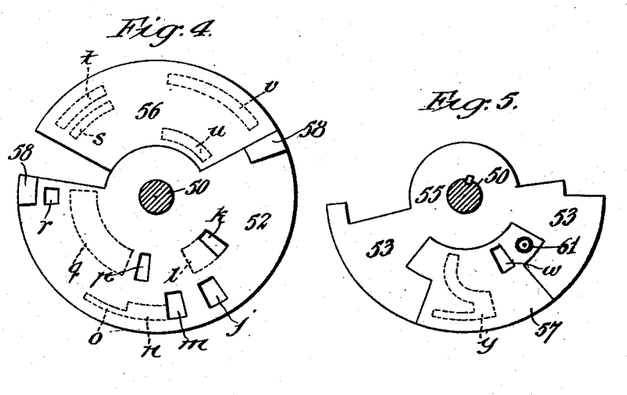
Fig. 4 is a face view of the main valve and sector valve in place thereon.
Fig. 5 is a face view of the upper valve and carrier.
Figure 6:
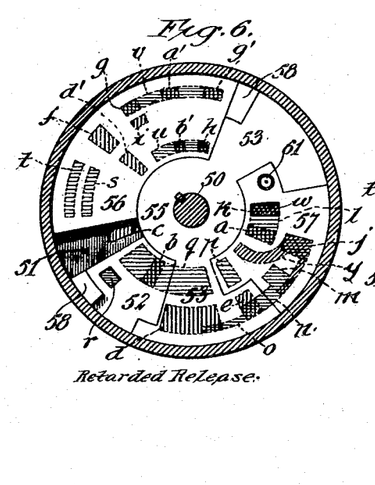
Fig. 6 is an enlarged section on line $x^6$—$x^6$ of Fig. 2 showing the relative position of the compound valve parts when in retarded release position.

Referring now to the valve segment 52, as shown in Fig. 4, $i$, $k$, $m$, $p$ and $r$ are ports which extend through valve 52, port $r$ being somewhat restricted in size, $l$ and $q$ are large cavities, and are formed on the under side of valve 52 so that they lie adjacent the valve seat 51, cavity $l$ being in communication with port $k$. $n$ is a smaller cavity which communicates with port $m$ and terminates in a narrow groove $o$. $s$, $t$, $u$ and $v$ are segmental grooves on the under side of the valve 56.

Referring to the upper valve 57, shown in Fig. 5, $w$ is a port through the valve, $y$ is a cavity on the under side properly restricted for service application and slow graduated release. 61 designates the check valve previously described. As stated before, valve 57 moves in unison with shaft 50 and may move a certain distance before valve 52 is engaged, and the latter may then move a certain distance before engaging valve 56. These distances are equal and are each equivalent to the extent of rotation produced by the rack and gear of the operating pistons when the latter move one step as hereafter described. It is thus manifest that the valves will have a number of combinations of positions dependent not only on the position of the pistons but dependent also on the direction of their previous movement. The valve operating pistons have six positions: First, with springs 16 and 19 both compressed. Second, with spring 19 expanded to its limit and shoulder 21 resting against sleeve 18. Third, with both springs expanded to their limits and stem 14 resting against spring 16. Fourth, with stem 14 and piston 7 equidistant respectively from spring 16 and stop 22. Fifth, with piston 7 resting against stop 22 and spring 13 expanded. Sixth, with piston 7 resting against stop 22 and spring 13 compressed. The length of movement between these positions are equal except that the length of movement between the first and second positions may be less than the others.

For convenience in describing the operation of the brake, the following terms will be used to indicate the different positions of the valves.

Retarded release position: When pistons stand in first position with all valves at the left limit of their movement. In this position port $w$ registers with port $k$, cavity $l$ with port $a$, and groove $v$ with ports $g$, $a'$, $g'$, and groove $u$ with $b'$ and $h$.

Running position with retarded release: With valves in retarded release position, pistons move to second position, moving valve 57 one space to the right.

Running position: With valves in retarded release position, pistons move to third position carrying valve 57 two spaces and valve 52 one space to the right.

Service application position: With valves in running position, pistons move to fifth position, carrying all three valves two spaces to the right.

Lap after service application: With valves in service application position, pistons move to fourth position, carrying valve 57 one space to the left.

Graduated release position: With valves at lap after service application, pistons move to third position, carrying valves 57 and 52 one space to the left.

Lap after graduated release: With valves at graduated release position, pistons move to fourth position carrying valve 57 one space to the right.

Full release position: With valves at graduated release position, pistons move to second position, carrying all three valves one space to the left. It will be noted that from the full release position the pistons may, and in fact, usually will return to the third position without going to the first. The result will still be the running position as before described, for, although the position of valve 56 will not be the same, all the connections will.

Emergency position: With pistons in sixth position, all valves being at the right limit of their movement.

In the operation of the brake it will be noted that the train pipe 1 is in permanent communication with the auxiliary reservoir 2 through restricted passage 3 and check valve 4, furnishing a constant feed. Assuming that the valves stand at running position, (see Fig. 8) the following communications exist between the train pipe 1 and supplemental reservoir 32 viz:—through chamber 8, ports $a$ and $k$ and check valve 61, to valve chamber 75, pipe 74, orifice 34 in check valve 33 and pipe 73 to supplemental reservoir 32. Also between train pipe 1 and chamber 9 viz:—through chamber 8, port $a'$, groove $v$, ports $g$, $g'$, pipe 69, to recess 47 of valve 44, then through pipe 68 to chamber 9. Between auxiliary reservoir 2 and chamber 10 and compartment 36, viz:—through pipe 66, branch 66', port $b'$, groove $u$, port $h$, pipe 70, branch 70' to recess 46 of valve 44, through pipe 71 to compartment 36. Also between brake cylinder and atmosphere, viz:—through pipe 64 and branch 64' to port $d$, cavity $n$, port $e$, and pipe 77 to atmosphere. All other ports are closed. It will be seen that train pipe pressure will now equalize into the supplemental reservoir 32, the auxiliary reservoir 2, and chamber 9, and also from the auxiliary reservoir into chamber 10 and compartment 36, thus permitting equalization of pressure throughout the apparatus, except the brake cylinder, which is open to the atmosphere. If, now, a service appplication is desired, a moderate reduction of train pipe pressure results in reduction in chamber 8 and also in chamber 9. The effect on piston 7 being thus neutralized, the greater auxiliary pressure in chamber 10 will force pistons to the left to fifth position placing the compound valve in service application position, Fig. 9, when the following communications exist: between auxiliary reservoir 2 and brake cylinder 40, viz:—through pipe 66 and branch 66' to port $b$, to port $p$, to groove $y$, to port $m$, to port $d$, to pipe 64', to pipe 64, to brake cylinder, air flowing into the latter and moving piston 41 and opening valve 42. Connection is also established between chamber 9 and brake cylinder 40 through pipe 68, recess 47 of valve 44 to pipe 69, port $g$, groove $t$, port $f$, pipe 65 and through valve 42 to brake cylinder 40. Also between compartment 36 and brake cylinder through valve 39, pipe 72, port $i$, groove $s$, port $f$, pipe 65 and valve 42. Air from chamber 9 now quickly flows into brake cylinder. The diaphragm valve 39 being open by reason of the greater surface of diaphragm 38' being exposed to equal pressure with the smaller diaphragm 38, air flows from chamber 10 into the brake cylinder, viz: through pipe 70 and 70', recess 46, pipe 71, compartment 36, through diaphragm valve 39, and through connections before described to the brake cylinder. When the pressure in chamber 10, and consequently in compartment 36, has reduced sufficiently for the force on diaphragm 38 to overcome it, valve 39 will close, retaining in chamber 10 and compartment 36 a pressure which bears a definite proportion to the pressure in supplemental reservoir 32, which proportion should be the same as that between the differential of areas of pistons 6 and 7 and the area of piston 6. In other words, if the areas of pistons 7 and 6 are as 1 is to 4, then the area of diaphragm 38 should be to the area of diaphragm 38' as 3 is to 4. It will now be seen that the resultant pressure in chamber 10 should balance the differential of train pipe pressure against pistons 6 and 7, when train pipe pressure is equal to supplemental reservoir pressure, but as the train pipe pressure has been reduced below the supplemental reservoir pressure it leaves an excess force against piston 6 tending to keep the pistons in the fifth position. Air continues to flow from auxiliary reservoir to brake cylinder until the pressure in chamber 9, which is in open communication with the brake cylinder, is sufficient to overcome the excess force before mentioned, when the positions will move to the fourth position, and valves to lap, being stopped in that position by striking valve 52 with its added friction, closing communication between auxiliary and brake cylinder by covering port $p$, and leaving other connections undisturbed. Leakage of brake cylinder or further reduction of train pipe pressure will again move the parts to service application position until sufficient air is supplied to the brake cylinder to compensate for leakage or to increase braking power, when they will again return to lap.

A graduated release may be secured by a gradual increase in train pipe pressure which will move pistons to the third position where stem 14 impinges on spring 16, moving the valves to graduated release position, wherein the same connections exist between brake cylinder and chamber 9 and between brake cylinder and chamber 10 as in service application position, and communication is opened between the brake cylinder and the atmosphere through pipe 64, branch 64', port $d$, port $m$, restricted portion of cavity $y$, ports $j$ and $e$ and pipe 77 to atmosphere. Air flows from brake cylinder to atmosphere until pressure in chamber 9 has reduced sufficiently when the excess force in chamber 10 will move pistons to fourth position and valve to lap shown in Fig. 12, wherein communication between brake cylinder and atmosphere is closed by the covering of port $j$, thus retaining a definite pressure in brake cylinder.

Figure 13:
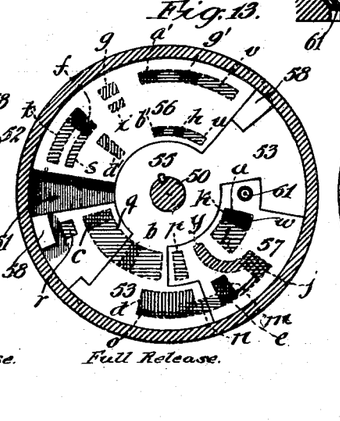
Fig. 13 is a similar view showing the position of the parts at full release.
Figure 14:
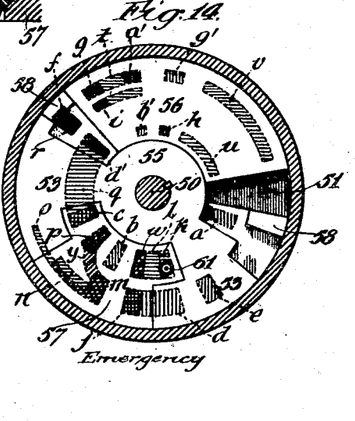
Fig. 14 is a similar view showing the position of the parts at emergency application.
Figure 16:
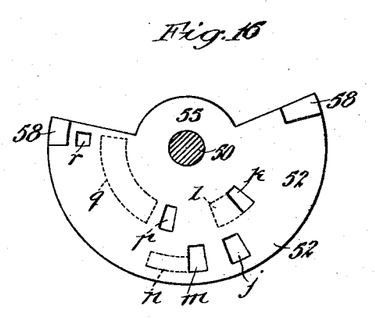
Fig. 16 shows a modified form of the valve with the port O omitted.

If a full release of the brakes is desired, a quick raise of train pipe pressure will compress spring 16 until shoulder 21 strikes sleeve 18 putting pistons in second position and compound valve in full release position, Fig. 13. This action is somewhat aided by retardation of release in graduated release, which is secured by restriction of cavity $y$ in valve 57. In full release position the following communications exist: between train pipe and chamber 9, between auxiliary reservoir and chamber 10, and between brake cylinder and atmosphere, all of these communications being through connections described in running position, also between train pipe and supplemental reservoir, viz: through chamber 8, port *a*, port *k*, port *w*, chamber 75, pipe 74, check valve 33, pipe 73 to supplemental reservoir 32. Air now escapes more quickly to the atmosphere from the brake cylinder, as cavity *n* is larger than *y*. Chamber 9 receives train pipe pressure, neutralizing piston 7, and chamber 10 receives auxiliary reservoir pressure. If train pipe pressure is still less than that in supplemental reservoir, the excess pressure in the latter will raise check valve 33 and quickly equalize into train pipe, and as the train pipe raises above the pressure in supplemental reservoir, check valve 33 will seat and air will slowly feed into the latter through orifice 34. If the raise of train pipe pressure still continues rapidly as would be the case at the head of a train where it receives the full force from the main reservoir of engine, it will be sufficient to also compress spring 19, passing pistons to first position and compound valve to retarded release position, Fig. 6, in which all connections are the same as in full release position, but port *d* is now in register with groove *o*, which is very much restricted, instead of with larger cavity *n*, hence the release is greatly retarded. If the restricted portion *o* of port *n* in valve 52 be eliminated as shown in the modified form of Fig. 16, the air is wholly retained while in this position.

Figures 7, 8:
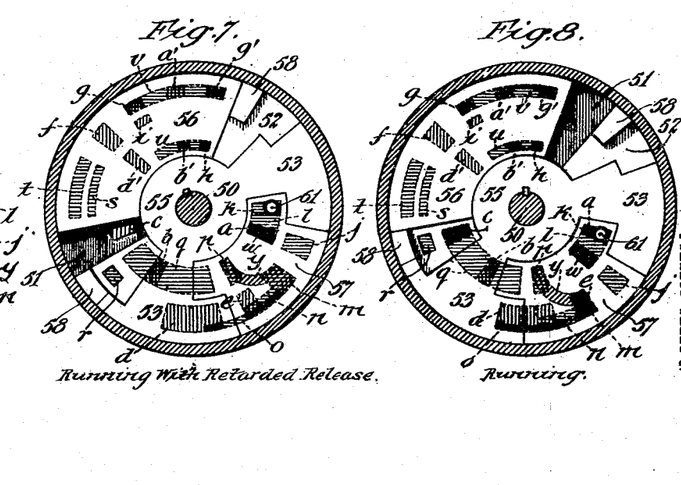
Fig. 7 is a similar view when the parts are in position for running with retarded release.
Fig. 8 is a similar view of the parts in position for running.
Figure 9:
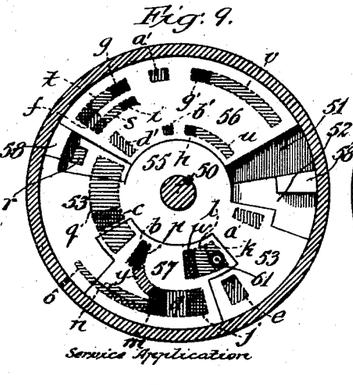
Fig. 9 is a similar view of the parts in service application position.
Figure 10:
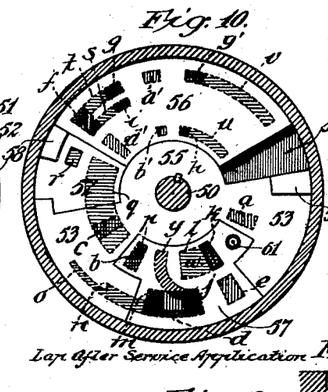
Fig. 10 is a similar view of the parts in position of lap after service application.
Figure 11:
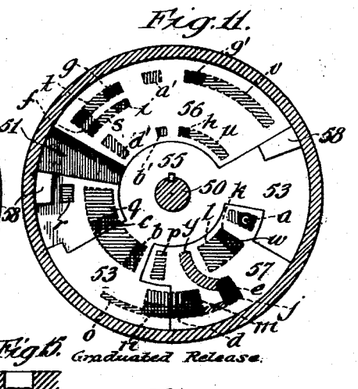
Fig. 11 is a similar view of the parts in graduated release position.
Figure 12:
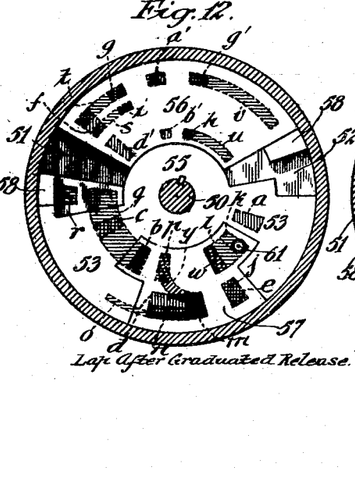
Fig. 12 is a similar view of the parts at lap after graduated release.

When pressure in the auxiliary reservoir has increased or train pipe has decreased so that the difference is insufficient to keep spring 19 compressed, it will expand moving pistons to second position and valves to running position with retarded release. All connections remain the same except that as shown in Fig. 7, port *k* is now in register with check valve 61 instead of with port *w*. While this permits free flow from train pipe to valve chamber 75, thus insuring maximum pressure on the upper side of rotary valves tending to keep them seated it restricts the flow in the opposite direction to the capacity of orifice in check valve 61, which will permit slow equalization when supplemental reservoir becomes overcharged, but will prevent unnecessary flow into train pipe when pressure in the latter is reduced for application. A further increase of auxiliary reservoir pressure or decrease of train pipe pressure will permit spring 16 to expand, carrying pistons to third position and valves to running position, in which all conditions are the same as in that last described, except that cavity *n*, as shown in Fig. 8, is again in register with ports *e* and *d*, permitting quick discharge of remaining air from brake cylinder.

In case brake is fully released by graduation, it is evident that chamber 9 will be open to brake cylinder and chamber 10 will be under reduced pressure, ordinarily permitting waste from leakage by pistons 6 and 7. To prevent this I have provided valve 42 in the brake cylinder, which is closed by the brake piston in returning to release position, and which closes connection between chamber 9 and 10 and the brake cylinder, whereupon pressure will accumulate in chamber 9 from said leakage until it is sufficient to move pistons to full release position.

An emergency application results from any quick and heavy reduction in train pipe pressure. Assuming valves to be in running position, auxiliary pressure on piston 6 not only forces both pistons to the left against knob 22, but also compresses spring 13 thus moving valves to emergency position. Ordinarily this movement may be depended on to be completed before the service application which it must pass has reduced pressure in chamber 10, but in case service application does result, the emergency follows as soon as train pipe pressure has dropped sufficiently below the retained pressure in chamber 10. It will also be seen that emergency application will result in the same manner when brakes are being carried in service application and reduction is made to a certain point below the retained pressure in chamber 10.

In passing to the sixth position, abutment 23 on sleeve $9^a$ strikes projection 24 and opens valve 25. Air now flows from train pipe through chamber 8, valve 25 into chamber 26, and raises check valve 27, passes through diaphragm chamber 28 and pipe 64 to brake cylinder. When pressure has raised sufficiently in brake cylinder the back pressure in chamber 28 against diaphragm 29 will compress spring 30, which has been set at a predetermined tension, and it will open valve 31, permitting quick and complete discharge of train pipe air to the atmosphere through stop cock $31^b$ which is normally open.

In emergency position other connections are as follows, between auxiliary reservoir and brake cylinder through pipe 66, check valve 43, pipe 67, port *c*, cavity *q*, port *d'*, through pipe 64' and pipe 64 to brake cylinder. Also between chamber 9 and train pipe, viz:—through pipe 68, recess 47 of valve 44, pipe 69, port *g*, groove *t*, through port *a'*, into chamber 8; and between supplemental reservoir and brake cylinder, viz:— through pipe 73 and 74, valve chamber 75, ports *r* and *f*, pipe 65 and open valve 42. Air now flows from chamber 9 to the train pipe in which the pressure is rapidly falling and from auxiliary to brake cylinder until they equalize, whereupon check valve 43 will seat, and from supplemental reservoir into brake cylinder. As the latter passage is restricted by the size of port *r*, the train pipe and auxiliary reservoir have furnished nearly their full supply before supplemental supply is well started, and the latter equalizes into the brake cylinder at a point considerably above the auxiliary reservoir pressure. Chamber 10 is sealed up by valves, but the movement of piston 6 to the sixth position brings the piston 6 over a very small leakage groove 31ª and air slowly escapes into train pipe until spring 13 is permitted to expand, closing valve 25 ready for release and recharge, but leaving other parts of the apparatus in the same position.

It will be seen that in emergency application, brake cylinder is in open communication with supplemental reservoir with no chance for leakage except brake cylinder and rotary valve leakage and leakage by check valve 27, and that when this leakage has reduced the pressure to that in the auxiliary reservoir, the volume of the latter is added to keep the brake applied, also that emergency application may be made without regard to previous position of the apparatus and brake piston, and that emergency application will carry past any number of non-air cars or cars with inoperative emergency apparatus, inasmuch as a slow reduction to a certain point below the retained pressure in compartment 10 is as effective as a quick reduction. These features are of considerable importance, as it is well known that with brakes in common use, the leakage past triple valve piston when the train pipe is empty will, in many cases, fully release the brakes in a short time. It is also known that after a full service application has been made it is worse than useless to make any further reduction in train pipe pressure, as it simply adds triple valve piston leakage to the brake cylinder leakage, thus reducing braking power more rapidly. In other brakes a rapid reduction is necessary to secure emergency application, and if the feature providing for local train pipe reduction is inoperative on several cars in succession, the fall in pressure beyond those cars is so slow that the brakes fail to go to emergency.

It will be noted that leakage by pistons 6 and 7 is nullified by equalization of pressure when brakes are released, and that during application it passes to the brake cylinder and is unobjectionable but is in fact desirable up to the point where it compensates for brake cylinder leakage. A slight leakage by piston should, in fact, be provided for to compensate for any possible leakage of diaphragm valve 39.

In using this brake it is necessary that an engineer's valve providing for constant feed at variable pressures be used, also that the larger number of brakes in the train shall be of this type. In case conditions of any kind exist that render it undesirable that the special features of this brake be used, I have provided hand valve 44, a partial turn of which opens permanent communication between the auxiliary reservoir and chamber 10, and between train pipe and chamber 9, closes communication between chamber 10 and compartment 36 of diaphragm chamber 35, thus rendering port $i$ inoperative. As chambers 8 and 9 now receive train pipe pressure, piston 7 is neutralized, and train pipe pressure acts against auxiliary reservoir pressure in chamber 10 in the same manner as in ordinary brakes of the Westinghouse or similar types, the operation being the same except that when train pipe pressure raises sufficiently above auxiliary pressure in releasing and recharging, spring 16 is compressed permitting quick equalization of supplemental reservoir into train pipe, of if the increase is still more rapid, both springs 16 and 19 are compressed, resulting also in retarded release. Also, in emergency application the train pipe and auxiliary first furnish the air supply to the brake cylinder, and the supplemental reservoir slowly follows with its full pressure with much less chance for leakage than in the ordinary brake.

In operating with hand valve 44 closed, the stop cock 31ᵇ should be closed which will prevent escape of train pipe pressure from chamber 8 when release of brakes is desired. To release brakes from a car or cars that are detached from the engine or when for any reason brakes cannot be released by increase of train pipe pressure, I have provided pipe 76 with a stop cock 63 between the supplemental reservoir and the train pipe. With this stop cock open pressure will equalize from the supplemental reservoir to the train pipe producing sufficient increase in the latter to release brakes. Manifestly if the train pipe is closed this will also release all other brakes which are coupled to the first one, therefore, when this is not desired the opening of set cock 62 will release the individual brake without disturbing others.

I have shown pipes connecting the several chambers in order that the connections may be easily traced, but it should be understood that in actual construction most of the passageways would be ducts formed in the castings, and the specific construction of the valves and other parts of the apparatus may be modified as desired.

What I claim is:—

1. In an automatic air brake system, a train pipe, a casing, two pistons of different areas in said casing dividing the casing into three chambers, and means of equalizing pressure in the train pipe and the three chambers at maximum train pipe pressure.

2. In an automatic air brake system, a train pipe, a piston casing, two pistons of different areas therein dividing it into a first chamber between the pistons in permanent communication with the train pipe, a second chamber adjacent to the larger piston, a third chamber adjacent to the smaller piston, and a valve normally giving communication between the train pipe and the third chamber and adapted to close said communication upon reduction of train pipe pressure.

3. In an automatic air brake system, a train pipe, a brake cylinder, a piston casing, two pistons of different areas therein dividing it into a first chamber between the pistons in permanent communication with the train pipe, a second chamber adjacent to the larger piston, a third chamber adjacent to the smaller piston, and a valve adapted to open communication between the brake cylinder and the third chamber upon a reduction of train pipe pressure.

4. In an automatic air brake system, a train pipe, a brake cylinder, a piston casing, two pistons of different areas therein dividing it into a first chamber between the pistons in permanent communication with the train pipe, a second chamber adjacent to the larger piston, a third chamber adjacent to the smaller piston, a valve normally opening communication between the train pipe and the third chamber and adapted to close said communication and to open communication between the third chamber and the brake cylinder upon reduction of train pipe pressure, and a valve adapted to close the latter communication and to reopen communication between the train pipe and the third chamber upon further reduction of train pipe pressure.

5. In an automatic air brake system, a train pipe, an auxiliary reservoir, a piston subjected to permanent train pipe pressure on one side, and subjected normally to auxiliary reservoir pressure on the other side, and means for reducing the pressure on the auxiliary side independently of both train pipe and auxiliary reservoir pressure.

6. In an automatic air brake system, a train pipe, an auxiliary reservoir, a brake cylinder, a piston casing, a piston therein dividing it into a first chamber in permanent communication with the train pipe, a second chamber normally in communication with the auxiliary reservoir, a valve closing said communication upon a reduction of train pipe pressure, a valve opening communication between the second chamber and the brake cylinder upon a reduction of train pipe pressure, and a valve closing the last named communication after a definite pressure in the second chamber has resulted.

7. In an automatic air brake system, a train pipe, a supplemental reservoir, a brake cylinder, a valve normally opening communication between the supplemental reservoir and the train pipe, and adapted to close upon a reduction of train pipe pressure, and a valve adapted to open communication between the supplemental reservoir and the brake cylinder upon a continued reduction of train pipe pressure.

8. In an automatic air brake system, a train pipe, a supplemental reservoir, a piston casing, a piston therein dividing it into a first chamber in permanent communication with the train pipe, a second chamber, a diaphragm chamber divided by two opposing diaphragms of different areas into two compartments, the compartment adjacent to the smaller diaphragm being in open permanent communication with the supplemental reservoir, and the compartment adjacent to the larger diaphragm being in open permanent communication with the second chamber of the piston casing, means of communication between the latter chamber and the brake cylinder, a valve operated by said piston normally closing said communication and adapted to open it upon a reduction of train pipe pressure, and a valve operated by said diaphragms adapted to close said communication upon a definite reduction of pressure in said second chamber.

9. In an automatic air brake system, a train pipe, a supplemental reservoir, a piston casing, a piston therein dividing it into a first chamber in permanent communication with the train pipe, a second chamber, a diaphragm exposed permanently to pressure from the supplemental reservoir, and a valve operated by said diaphragm permitting escape of air from the second chamber, and adapted to close and retain a definite pressure in said second chamber.

10. In an automatic air brake system, a train pipe, a brake cylinder, a piston casing, a piston therein dividing it into a first chamber in permanent communication with the train pipe, a second chamber, a valve operated by said piston opening communication between said second chamber and the brake cylinder, a diaphragm exposed permanently to pressure from the second chamber opposed to other pressure, and a valve operated by said diaphragm adapted to close communication between the second chamber and the brake cylinder upon a definite reduction in said second chamber.

11. In an automatic air brake system, a train pipe, a brake cylinder, a piston exposed on one side to train pipe pressure, a spring opposing a portion of the movement of said piston from train pipe pressure, a valve opening communication between brake cylinder and atmosphere on compression of said spring, a second spring opposing final movement of piston from train pipe pressure, and a valve for checking communication between brake cylinder and atmosphere upon compression of said second spring.

12. In an automatic air brake system, a train pipe, a brake cylinder, a piston exposed to train pipe pressure, a valve operated by said piston opening communication between the brake cylinder and the atmosphere, a spring opposing final movement of said piston from train pipe pressure, a valve operated by said piston for checking communication between the brake cylinder and the atmosphere upon compression of said spring, and permitting expansion of said spring without restoring said communication.

13. In an automatic air brake system, a train pipe, a brake cylinder, a piston casing, two pistons of different areas therein dividing it into a first chamber between the pistons in permanent communication with the train pipe, a second chamber adjacent to the larger piston, a third chamber adjacent to the smaller piston, air pressure in the three chambers being normally equalized, means for reducing pressure in the second chamber, and means to establish communication between the third chamber and the brake cylinder, whereby the differential of train pipe pressure on the two pistons, together with the brake cylinder pressure in the third chamber will be opposed against the reduced pressure in the second chamber.

14. In an automatic air brake system, a brake cylinder, a piston casing, two pistons of different areas therein, dividing it into a first chamber between the pistons, a second chamber adjacent to the larger piston, and a third chamber adjacent to the smaller piston, means of communication between the brake cylinder and the second and third chambers respectively, and a valve operated by the brake piston adapted to close said communication when the brake piston is at release position.

15. In an automatic air brake system, a train pipe, a brake cylinder, a piston exposed to train pipe pressure, an air chamber, a valve operated by said piston opening communication between train pipe and said air chamber, a check valve permitting flow of air from said air chamber to brake cylinder, a diaphragm subjected to brake cylinder pressure, and a valve operated by said diaphragm opening communication between said air chamber and atmosphere.

16. In an automatic air brake system, a train pipe, a piston casing, a piston therein dividing it into a first chamber in permanent communication with the train pipe, and a second chamber, an opposing pressure in the second chamber, a spring resisting final movement of said piston from the opposing pressure upon a reduction of train pipe pressure, a valve operated by said piston opening communication between train pipe and brake cylinder or atmosphere upon compression of said spring, said first chamber having a port permitting equalization of pressure in the two chambers and consequent expansion of said spring.

17. In an automatic air brake system, a train pipe, a piston casing, a piston therein dividing it into a first chamber in permanent communication with the train pipe, and a second chamber, an opposing pressure in the second chamber, a spring resisting final movement of said piston from the opposing pressure upon a reduction of train pipe pressure, a valve operated by said piston opening communication between train pipe and brake cylinder or atmosphere upon compression of said spring, and means co-acting with said piston for permitting equalization of pressure in the two chambers and consequent expansion of said spring.

18. In an automatic air brake system, a piston chamber, a valve operating piston therein, a second piston in the same chamber having its stem in a line with that of the first, and adapted to coact with the first, means whereby said pistons may have a limited movement independent of each other, and a spring tending to hold them at the outer extremity of this limit.

19. In an automatic air brake system, a train pipe, a brake cylinder, an auxiliary reservoir, a piston chamber, two pistons of different areas therein dividing it into a first chamber between the pistons, in permanent communication with the train pipe, a second chamber adjacent to the larger piston, and a third chamber adjacent to the smaller piston, means of communication between the second chamber and the brake cylinder and auxiliary reservoir respectively, and between the third chamber and the train pipe and brake cylinder respectively, and a hand controlled valve closing communication between the brake cylinder and the second and third chambers, respectively, and opening permanent communication between the second chamber and the auxiliary reservoir and between the third chamber and the train pipe.

20. In an automatic air brake system, a brake cylinder, a piston casing, two pistons of different areas therein, means of rendering the pistons co-active with a limited, relative movement, means of communication between the brake cylinder and the chamber adjacent to the smaller piston, springs resisting final movement of the larger piston in each direction, and a valve operated by the larger piston adapted to close said communication between brake cylinder and piston chamber upon compression of either spring.

21. In an automatic air brake system, a train pipe, an auxiliary reservoir, a supplemental reservoir, a brake cylinder, a piston casing, two pistons of different areas therein dividing it into a first chamber between the pistons, in permanent communication with the train pipe, a second chamber adjacent to the larger piston, a third chamber adjacent to the smaller piston, and valves operated by said pistons which in retarded release position open communication between the auxiliary reservoir and the second chamber, between the train pipe and the third chamber, between the brake cylinder and the atmosphere by a restricted passage, and between the train pipe and the supplemental reservoir, the latter being restricted in flow from the train pipe to the supplemental reservoir but permitting free flow in the opposite direction.

22. In an automatic air brake system, a train pipe, an auxiliary reservoir, a supplemental reservoir, a brake cylinder, a piston casing, two pistons of different areas therein dividing it into a first chamber between the pistons in permanent communication with the train pipe, a second chamber adjacent to the larger piston, a third chamber adjacent to the smaller piston, and valves operated by said pistons which in running with retarded release position, open communication between the auxiliary reservoir and the second chamber, between the train pipe and the third chamber, between the brake cylinder and the atmosphere by a restricted passage, and between the train pipe and the supplemental reservoir, the latter being restricted in both directions.

23. In an automatic air brake system, a train pipe, an auxiliary reservoir, a supplemental reservoir, a brake cylinder, a piston casing, two pistons of different areas therein dividing it into a first chamber between the pistons, in permanent communication with the train pipe, a second chamber adjacent to the larger piston, a third chamber adjacent to the smaller piston, and valves operated by said pistons which in running position, open communication between the auxiliary reservoir and the second chamber, between the train pipe and the third chamber, between the brake cylinder and the atmosphere by a free passage, and between the train pipe and the supplemental reservoir by a restricted passage.

24. In an automatic air brake system, an auxiliary reservoir, a brake cylinder, a reducing valve, a piston casing, two pistons of different areas therein dividing it into a first chamber between the pistons, a second chamber adjacent to the larger piston, a third chamber adjacent to the smaller piston, and valves operated by said pistons which in service application position, open communication between the auxiliary reservoir and the brake cylinder, between the brake cylinder and the third chamber, and between the brake cylinder and the second chamber through said reducing valve.

25. In an automatic air brake system, a brake cylinder, a reducing valve, a piston casing, two pistons of different areas therein dividing it into a first chamber between the pistons, a second chamber adjacent to the larger piston, a third chamber adjacent to the smaller piston, and valves operated by said pistons which in lap position open communication between the brake cylinder and the third chamber, and between the brake cylinder and the second chamber through said reducing valve.

26. In an automatic air brake system, a brake cylinder, a reducing valve, a piston casing, two pistons of different areas therein dividing it into a first chamber between the pistons, a second chamber adjacent to the larger piston, a third chamber adjacent to the smaller piston, and valves operated by said pistons which in graduated release position open communication between the brake cylinder and the atmosphere, between the brake cylinder and the third chamber, and between the brake cylinder and the second chamber through the said reducing valve.

27. In an automatic air brake system, a train pipe, an auxiliary reservoir, a supplemental reservoir, a brake cylinder, a piston casing, two pistons of different areas therein dividing it into a first chamber between the pistons, in permanent communication with the train pipe, a second chamber adjacent to the larger piston, a third chamber adjacent to the smaller piston, and valves operated by said pistons which, in full release position, open communication between the brake cylinder and the atmosphere by a free passage, between the train pipe and the third chamber, between the auxiliary reservoir and the second chamber, and between the train pipe and the supplemental reservoir, the latter passage permitting free flow from supplemental reservoir to the train pipe, but restricting flow in the opposite direction.

28. In an automatic air brake system, a train pipe, an auxiliary reservoir, a supplemental reservoir, a brake cylinder, a piston casing, two pistons of different areas therein dividing it into a first chamber between the pistons in permanent communication with the train pipe, a second chamber adjacent to the larger piston, a third chamber adjacent to the smaller piston, and valves operated by said pistons which, in emergency application position, open communication between the train pipe and the third chamber, between the train pipe and the brake cylinder, between the train pipe and the second chamber by a restricted port, between the supplemental reservoir and the brake cylinder, and between the auxiliary reservoir and the brake cylinder by a passage containing a check valve preventing flow of air from the brake cylinder to the auxiliary reservoir.

29. In an automatic air brake system, a train pipe, a brake cylinder, an air passage between the train pipe and the atmosphere, a valve in said passage normally closed and adapted to open upon a definite reduction of train pipe pressure, and a valve in said passage normally closed and adapted to open upon a definite increase in brake cylinder pressure.

30. In an automatic air brake system, a train pipe, an auxiliary reservoir, a casing, two pistons of different areas in said casing dividing the casing into three chambers, and means for equalizing pressure in the train pipe and the three chambers of the piston casing at auxiliary reservoir pressure.

31. In an automatic air brake system, a train pipe, an auxiliary reservoir, a supplemental reservoir, a brake cylinder, a valve adapted to open communication between the auxiliary reservoir and the brake cylinder upon a reduction of train pipe pressure, and a valve adapted to open direct communication between the supplemental reservoir and the brake cylinder upon a further reduction of train pipe pressure.

32. In an automatic air brake system, a train pipe, a brake cylinder, a piston exposed constantly to train pipe pressure on one side and exposed normally to train pipe pressure on the other side, means for withdrawing train pipe pressure from the latter side, and means for exposing said latter side to brake cylinder pressure.

33. In an automatic air brake system, an auxiliary reservoir, a piston chamber, a piston therein normally subjected on one side to auxiliary reservoir pressure and opposed on its other side by other pressure, a valve operated by said piston adapted to close communication between the auxiliary reservoir and said chamber, means for reducing pressure on the auxiliary reservoir side of said piston, and means for checking said reduction of pressure when a definite pressure has resulted.

34. In an automatic air brake system, an auxiliary reservoir, a supplemental reservoir, a brake cylinder, a valve opening communication between the supplemental reservoir and the brake cylinder, a valve opening communication between the auxiliary reservoir and the brake cylinder, and a valve in the latter communication checking and preventing flow of air from the brake cylinder to the auxiliary reservoir.

35. In an automatic air brake system, a train pipe, a piston casing, two pistons of different areas therein dividing it into a first chamber between the pistons in permanent communication with the train pipe, a second chamber adjacent to the larger piston, a third chamber adjacent to the smaller piston, and a hand controlled valve for opening constant communication between the train pipe and the third chamber of the piston casing.

36. In an automatic air brake system, an auxiliary reservoir, a piston casing, two pistons of different areas therein dividing it into a first chamber between the pistons, a second chamber adjacent to the larger piston, a third chamber adjacent to the smaller piston, and a hand controlled valve adapted to open constant communication between the auxiliary reservoir and the second chamber of the piston casing.

37. In an automatic air brake system, a brake cylinder, a piston casing, two pistons of different areas therein dividing it into a first chamber between the pistons, a second chamber adjacent to the larger piston, a third chamber adjacent to the smaller piston, means of communication between the third chamber of the piston casing and the brake cylinder, and a hand controlled valve adapted to close said communication constantly.

38. In an automatic air brake system, a brake cylinder, a piston casing, two pistons of different areas therein dividing it into a first chamber between the pistons, a second chamber adjacent to the larger piston, and a third chamber adjacent to the smaller piston, means of communication between the brake cylinder and the second chamber of the piston casing, and a hand controlled valve adapted to close said communication constantly.

39. In an automatic air brake system, a train pipe, a piston subjected to permanent train pipe pressure on one side, and valves which in retarded release position, in running position, in full release position, or in emergency application position, are adapted to open free communication between the train pipe and the chamber on the opposite side of said piston.

40. In an automatic air brake system, a train pipe, a supplemental reservoir, and valves which in full release position, or in retarded release position are adapted to open communication between the supplemental reservoir and the train pipe, permitting free flow of air from the supplemental reservoir to the train pipe and restricting the flow in the opposite direction.

41. In an automatic air brake system, a train pipe, a supplemental reservoir and valves which in running position are adapted to open communication between the train pipe and the supplemental reservoir, said communication being restricted in both directions.

42. In an automatic air brake system, a brake cylinder, a piston casing, two pistons of different areas therein dividing it into a first chamber between the pistons, a second chamber adjacent to the larger piston, and a third chamber adjacent to the smaller piston, and valves which in service application position, in graduated release position, or in lap position, are adapted to open communication between the brake cylinder and the third piston chamber.

43. In an automatic air brake system, a train pipe, a brake cylinder, a piston casing, a piston therein dividing it into a first chamber in permanent communication with the train pipe and a second chamber, a valve adapted to retain a definite pressure in the second piston chamber and valves which in service application position, in graduated release position, or in lap position, are adapted to open communication between the brake cylinder and said second piston chamber through said retaining valve.

44. In an automatic air brake system, a train pipe, a piston subjected to permanent train pipe pressure on one side, and a hand controlled valve adapted to open constant communication between the train pipe and the chamber on the opposite side of said piston.

In testimony whereof, I have hereunto set my hand at Los Angeles, California, this 21st day of February, 1908.

JAMES O. DODGE.

In presence of—
GEORGE T. HACKLEY,
FRANK L. A. GRAHAM.